US012811459B2

(12) United States Patent
Hashimoto et al.

(10) Patent No.: US 12,811,459 B2
(45) Date of Patent: Nov. 24, 2026

(54) STATOR

(71) Applicant: AISIN CORPORATION, Kariya (JP)

(72) Inventors: Shingo Hashimoto, Kariya (JP); Junichi Sugawara, Kariya (JP); Tokuhisa Mishina, Kariya (JP)

(73) Assignee: AISIN CORPORATION, Kariya (JP)

( * ) Notice: Subject to any disclaimer, the term of this patent is extended or adjusted under 35 U.S.C. 154(b) by 196 days.

(21) Appl. No.: 18/730,364

(22) PCT Filed: Apr. 19, 2023

(86) PCT No.: PCT/JP2023/015543
§ 371 (c)(1),
(2) Date: Jul. 19, 2024

(87) PCT Pub. No.: WO2023/204229
PCT Pub. Date: Oct. 26, 2023

(65) Prior Publication Data

US 2025/0119017 A1 Apr. 10, 2025

(30) Foreign Application Priority Data

Apr. 21, 2022 (JP) ................................ 2022-070351

(51) Int. Cl.
*H02K 3/28* (2006.01)

(52) U.S. Cl.
CPC .................................... *H02K 3/28* (2013.01)

(58) Field of Classification Search
CPC ............... H02K 3/28; H02K 3/48; H02K 3/50
USPC .......................................................... 310/208
See application file for complete search history.

(56) References Cited

U.S. PATENT DOCUMENTS 6,204,586 B1 3/2001 Umeda et al.
6,326,715 B1 * 12/2001 Asao ........................ H02K 3/12 310/71
2016/0056696 A1 * 2/2016 Ito ............................ H02K 3/12 29/596
2016/0190884 A1 * 6/2016 Nakamura ............... H02K 1/12 310/208
2017/0033630 A1 * 2/2017 Tamura .................... H02K 3/18
(Continued)

FOREIGN PATENT DOCUMENTS

JP 2001-169489 A 6/2001
JP 2004-104996 A 4/2004
(Continued)

OTHER PUBLICATIONS

Jul. 11, 2023 International Search Report issued in International Patent Application No. PCT/JP2023/015543.

*Primary Examiner* — Rashad H Johnson
(74) *Attorney, Agent, or Firm* — Oliff PLC

(57) ABSTRACT

A plurality of segment conductors include a plurality of general segment conductor continuously joined to each other to constitute a plurality of coil bodies, and a specific segment conductor joined to an end of each of a plurality of the coil bodies. Axially extending portions of at least some of a plurality of the specific segment conductors are arranged so as to have a portion that does not overlap the connecting portion in axial view along an axial direction and is sandwiched, in a radial direction, between a plurality of the connecting portions arranged at different positions in the radial direction.

11 Claims, 7 Drawing Sheets

(56) References Cited

U.S. PATENT DOCUMENTS

| | | | | |
|---|---|---|---|---|
| 2017/0117768 | A1* | 4/2017 | Nakamura | H02K 1/16 |
| 2018/0342918 | A1* | 11/2018 | Hino | H02K 1/165 |
| 2019/0149004 | A1 | 5/2019 | Tamura et al. | |
| 2019/0214874 | A1* | 7/2019 | Hashimoto | H02K 3/28 |
| 2020/0136457 | A1* | 4/2020 | Lee | H02K 3/48 |
| 2020/0274413 | A1* | 8/2020 | Egashira | H02K 3/50 |
| 2021/0167657 | A1* | 6/2021 | Koga | H02K 3/50 |
| 2021/0175758 | A1* | 6/2021 | Ayukawa | H02K 3/525 |
| 2021/0184528 | A1* | 6/2021 | Koga | H02K 15/064 |
| 2021/0194306 | A1* | 6/2021 | Koga | H02K 3/04 |
| 2021/0336502 | A1* | 10/2021 | Koshiba | H02K 3/345 |
| 2021/0344243 | A1* | 11/2021 | Koga | H02K 15/064 |
| 2021/0351653 | A1* | 11/2021 | Koga | H02K 15/064 |
| 2022/0311298 | A1* | 9/2022 | Han | H02K 3/12 |
| 2022/0344997 | A1* | 10/2022 | Takada | H02K 3/12 |
| 2022/0393535 | A1* | 12/2022 | Ishikawa | H02K 3/14 |
| 2023/0105198 | A1* | 4/2023 | Toi | H02K 1/16<br>310/179 |
| 2023/0369921 | A1* | 11/2023 | Takeda | H02K 1/16 |
| 2024/0223035 | A1* | 7/2024 | Takahata | H02K 3/12 |
| 2024/0250571 | A1* | 7/2024 | Kumada | H02K 3/12 |
| 2025/0167617 | A1* | 5/2025 | Hashimoto | H02K 3/12 |

FOREIGN PATENT DOCUMENTS

| | | | |
|---|---|---|---|
| JP | 2007-228708 | A | 9/2007 |
| JP | 2009-011152 | A | 1/2009 |
| JP | 2018-011491 | A | 1/2018 |

* cited by examiner

STATOR

TECHNICAL FIELD

The present disclosure relates to a stator of a rotating electrical machine including a cylindrical stator core having a plurality of slots arranged side by side in a circumferential direction, and a coil wound around the stator core.

BACKGROUND ART

JP 2018-11491 A discloses a stator (13) including a coil (30) formed using a segment conductor (40) made of a rectangular wire with a rectangular cross-section (The reference signs in parentheses in the background art are those of the literature.). The segment conductor (40) is formed in a substantially U-shape, and has two housed portions (linear portions (41)) that are portions corresponding to the sides of the U-shape and are inserted into groove-like slots (21) formed along the axial direction of a stator core (20) from one side in an axial direction and housed therein, and a connecting portion (turn portion (42)) that is a portion corresponding to the bottom of the U-shape and connects the two housed portions. The segment conductor (40) is disposed in the stator core in a state where the connecting portion projects from the stator core (20) on one side in the axial direction of the stator core (20). On the other side in the axial direction of the stator core (20), a lead portion (32, 33) that is a portion corresponding to an end of the side of the U-shape and extends from the housed portion projects from the stator core (12). The lead portion (32, 33) is joined to the lead portion (32, 33) of another segment conductor (40) by welding or the like, so that the coil body of the coil (stator winding (20)) is formed.

CITATION LIST

Patent Literature

Patent Literature 1: JP 2018-11491 A

SUMMARY OF DISCLOSURE

Technical Problems

Coils include not only a general segment conductor forming a coil body but also a specific segment conductor such as a segment conductor functioning as a power line connecting the coil body and a power supply. The specific segment conductor has a housed portion housed in a slot of a stator core and an axially extending portion extending in the axial direction of the stator core. In a case where the segment conductors are housed from the radially outer side to the radially inner side of the stator core, the specific segment conductors are often arranged on the radially inner side. In a case where the connecting portion of the segment conductor disposed on the radially innermost side among the segment conductors constituting the coil body overlaps the radially innermost portion of the slot in axial view, it is difficult to insert a specific segment conductor into the slot along the axial direction after the connecting portion is disposed in the radially innermost portion of the slot. On the other hand, when the segment conductor having the connecting portion is attached to the stator core after the specific segment conductor is inserted into the slot, the difficulty of assembling work increases, which may lead to a decrease in workability. In addition, it is conceivable to insert both the segment conductor having the connecting portion and the specific segment conductor into the slots along the axial direction in a state where these segments are combined in advance, but in this case as well, the difficulty of the assembling work increases, which may lead to a decrease in workability. That is, there is a possibility that the specific segment conductor cannot be easily housed in the slot due to interference with the connecting portion.

In view of the above background, it is desirable to obtain a stator in which a specific segment conductor can be attached to a stator core so as not to interfere with a segment conductor constituting the coil body when the segment conductor is assembled to the stator core.

Solutions to Problems

In view of the above, a stator of a rotating electrical machine including a stator core with a cylindrical shape, having a plurality of slots arranged side by side in a circumferential direction, and a coil wound around the stator core, a direction along an axial center of the stator core is assumed to be an axial direction, a direction orthogonal to the axial center is assumed to be a radial direction, one side in the axial direction is assumed to be an axial first side, and another side in the axial direction is assumed to be an axial second side, the coil is configured by joining a plurality of segment conductors, a plurality of joint portions joining a plurality of the segment conductors to each other are provided on the axial second side of the stator core, a plurality of the segment conductors include a plurality of general segment conductors continuously joined to each other to constitute a plurality of coil bodies and a specific segment conductor joined to an end of each of a plurality of the coil bodies, each of the general segment conductors includes a first housed portion housed in a first slot as a first slot of the slots, a second housed portion housed in a second slot that is the slot disposed to be spaced apart from the first slot in the circumferential direction, and a connecting portion connecting the first housed portion and the second housed portion on the axial first side of the stator core, the specific segment conductor includes a specific housed portion housed in the slot and an axially extending portion extending along the axial direction on the axial first side of the stator core, and the axially extending portions of at least some of a plurality of the specific segment conductors are arranged so as to have a portion that does not overlap the connecting portion in axial view along the axial direction and is sandwiched, in the radial direction, between a plurality of the connecting portions arranged at different positions in the radial direction.

A plurality of the segment conductors are assembled to the stator core by being inserted into the slots of the stator core from the axial first side. According to this configuration, in this case, when a plurality of the segment conductors assembled in order from those arranged on the radially outer side in the slots, it is easy to prevent the specific segment conductor from hindering the assembly of the general segment conductor, and to prevent the general segment conductor from hindering the assembly of the specific segment conductor. That is, according to this configuration, it is desirable to obtain the stator in which the specific segment conductor can be attached to the stator core so as not to interfere with the segment conductor constituting the coil body when the segment conductor is assembled to the stator core.

Further features and advantages of the stator of the rotating electrical machine will become apparent from the following description of exemplary and non-limiting embodiments, which will be described with reference to the drawings.

DESCRIPTION OF EMBODIMENTS

Figure 1:
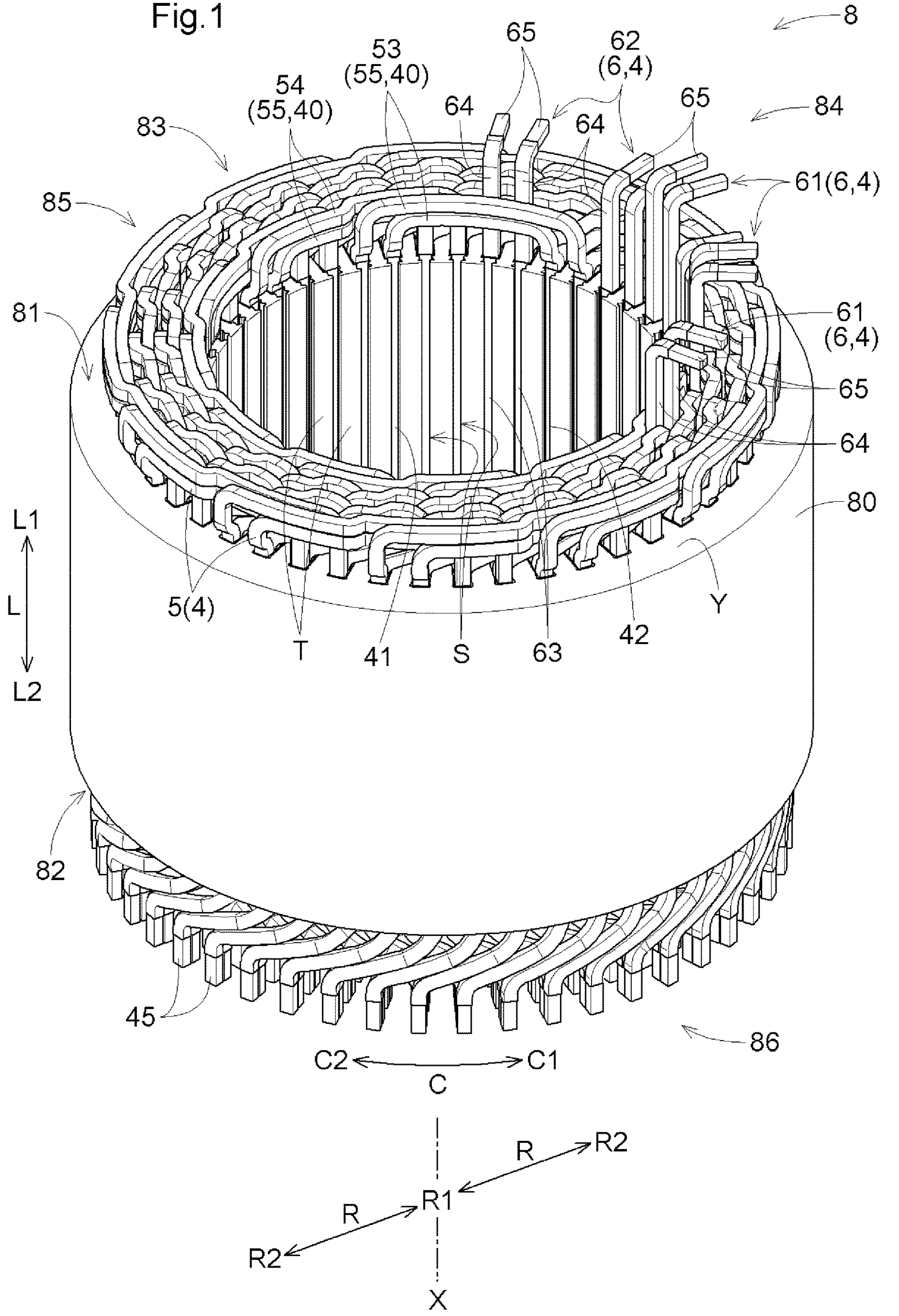
FIG. 1 is a perspective diagram illustrating an appearance of a stator.

Hereinafter, embodiments of a stator of a rotating electrical machine will be described with reference to the drawings. The perspective diagram of FIG. 1 illustrates a stator 8 in which a coil 84 (stator coil) is wound around a stator core 80. In the following description, "axial direction L", "radial direction R", and "circumferential direction C" are defined with reference to the axial center X of the stator core 80 around which the coil 84 is wound. As illustrated in FIG. 1, one side in the axial direction L is defined as an axial first side L1, and the other side in the axial direction L (side opposite to the axial first side L1) is defined as an axial second side L2. In addition, one side in the circumferential direction C is defined as a circumferential first side C1, and the other side in the circumferential direction C (side opposite to the circumferential first side C1) is defined as a circumferential second side C2. In the following description, each of the directions of the coil 84 and a segment conductor 4 forming the coil 84 is a direction in a state where the coil 84 is wound around the stator core 80.

Figure 2:
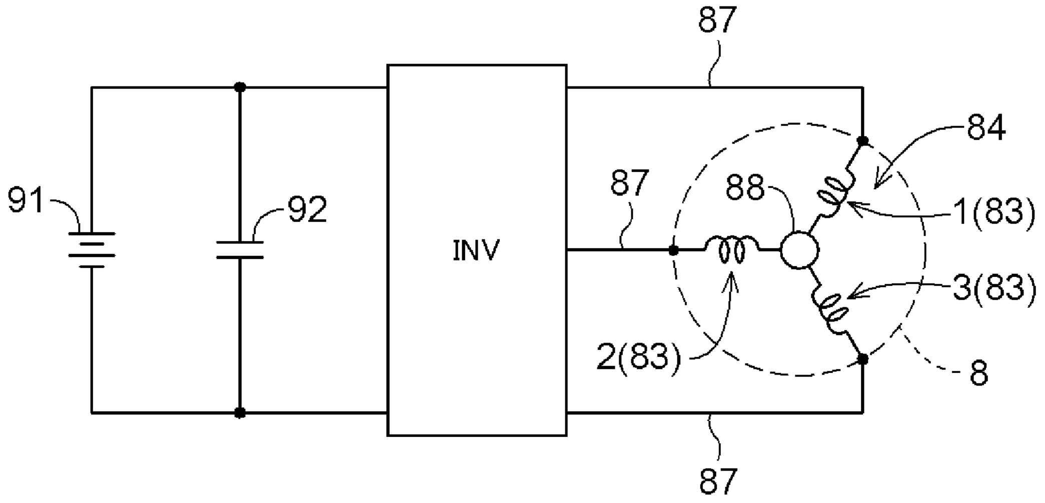
FIG. 2 is a schematic circuit block diagram illustrating an example of electrical connection to a coil.

As illustrated in FIG. 2, an inverter INV is provided as an AC power supply that supplies AC power to the rotating electrical machine (stator 8). The inverter INV is connected between a DC power supply 91 and the coil 84, and converts power between DC power and multi-phase (here, three-phase) AC power. The inverter INV includes a plurality of switching elements. The rotating electrical machine can function as both an electric motor and a generator, and when functioning as a generator, the generated AC power is converted into DC power by the inverter INV and supplied to the DC power supply 91. The DC power supply 91 includes, for example, a secondary battery (battery) such as a nickel hydrogen battery or a lithium ion battery, an electric double layer capacitor, or the like. In a case where the rotating electrical machine is a driving power source of a vehicle, the DC power supply 91 is a high-voltage, high-capacity power supply, and the rated power supply voltage is, for example, 200 to 400 [V]. A DC link capacitor 92 (smoothing capacitor) that smooths a voltage (DC link voltage) on the DC side of the inverter INV is provided on the DC side of the inverter INV. The DC link capacitor 92 stabilizes a DC voltage (DC link voltage) that fluctuates depending on the fluctuation of the power consumption of the rotating electrical machine.

As illustrated in FIG. 2, in the present embodiment, the coil 84 is a Y-connected coil in which three phases (U-phase, V-phase, W-phase) are connected at a neutral point. Although details will be described later, the three-phase coils (here, a first-phase coil 1, a second-phase coil 2, and a third-phase coil 3) are electrically connected to each other by a neutral point bus bar 88. The three-phase coils are electrically connected to the three-phase AC outputs of the inverter INV by power line bus bars 87. The first-phase coil 1 may be any of the U-phase, the V-phase, and the W-phase, and the second-phase coil 2 and the third-phase coil 3 similarly correspond to any of the U-phase, the V-phase, and the W-phase depending on the first-phase coil 1.

As illustrated in FIG. 1, the coil 84 is wound around the stator core 80 in which a plurality of slots S and a plurality of teeth T extending in the axial direction L are formed in the circumferential direction C. The stator core 80 includes a yoke Y formed in an annular shape as viewed in the axial direction L, and the plurality of teeth T extending from the yoke Y to a radially inner side R1 (side on which a rotor (not illustrated) is disposed in the present embodiment). A groove-like slot S having a bottom on a radially outer side R2 is formed between two teeth T adjacent in the circumferential direction C. In the present embodiment, the slot S is a semi-open slot, and the opening on the radially inner side R1 of the slot S is formed to have a smaller width in the circumferential direction C than the region of the slot S where the coil 84 is disposed. Here, the width of the opening of the slot S in the circumferential direction C is formed to be smaller than a long side length W1 to be described later. The stator core 80 is made of a magnetic material. For example, the stator core 80 is formed by stacking a plurality of magnetic plates (for example, electromagnetic steel sheets such as silicon steel sheets). Alternatively, the stator core 80 is made of, as a main component, a green compact formed by pressure-molding magnetic material powder.

Figure 5:
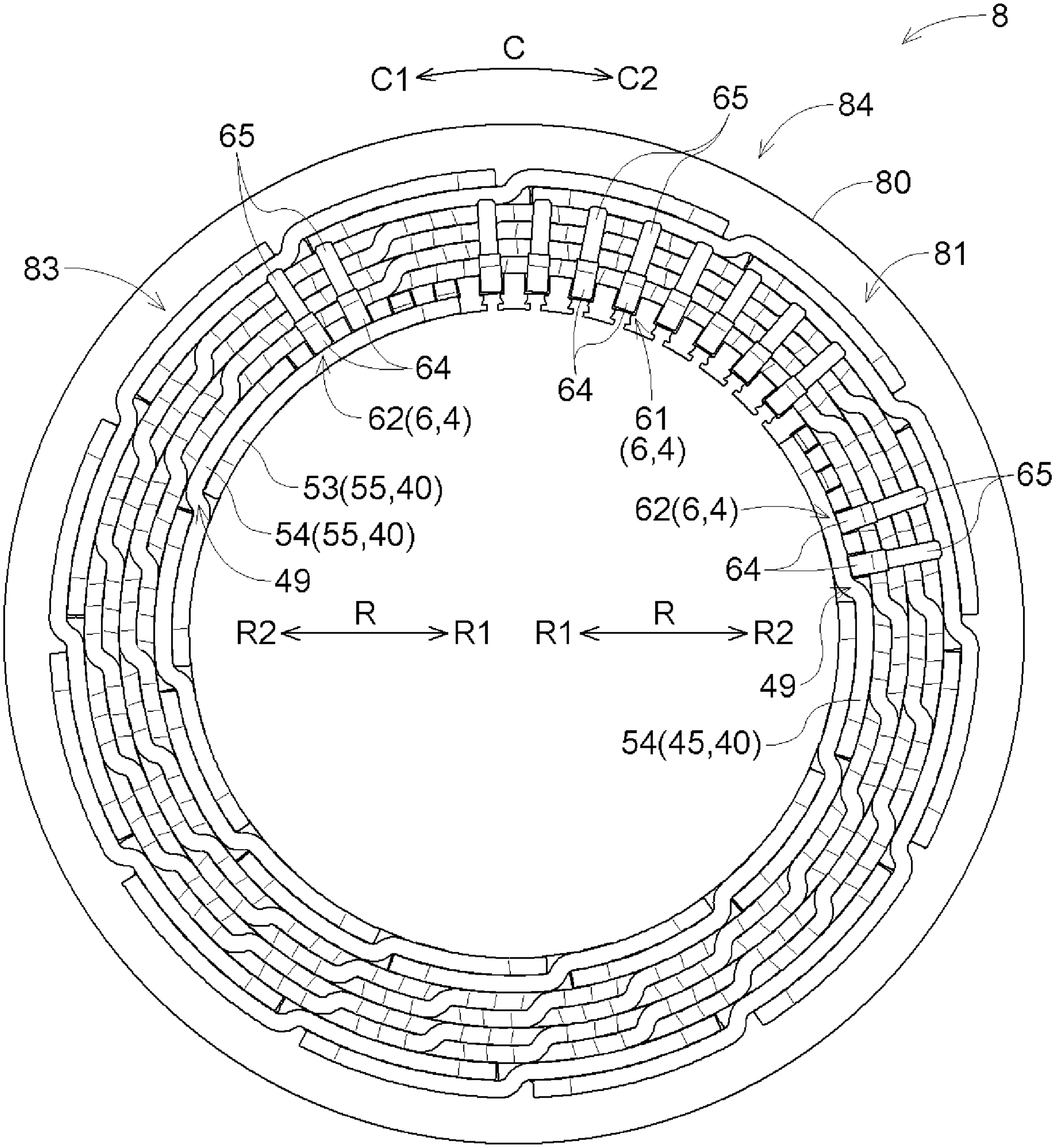
FIG. 5 is a plan view of the stator as viewed from an axial first side.

The coil 84 includes a plurality of housed portions (a first end-side housed portion 41, a second end-side housed portion 42, and a specific housed portion 63 to be described later) arranged in the slots S. In the present embodiment, the housed portion is disposed in the slot S so as to extend parallel to the axial direction L. In the coil 84, as illustrated in FIGS. 1, 5, and the like, the plurality of housed portions are arranged inside one slot S in a layered manner with the arrangement region of one housed portion in the radial direction R as one layer. In the present embodiment, the coil 84 has a six-layer winding structure, and a plurality of housed portions stacked in six layers are arranged in a line along the radial direction R inside one slot S. Therefore, in the present embodiment, a maximum of six housed portions are arranged side by side in the radial direction R inside one slot S.

Figure 3:
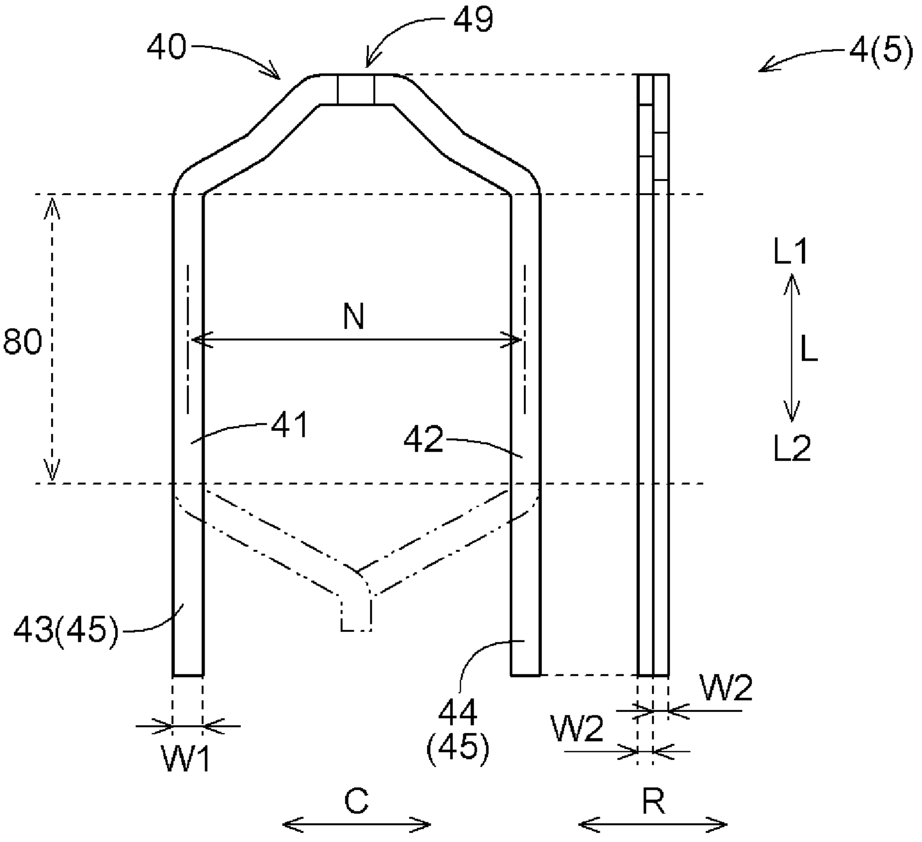
FIG. 3 is a diagram schematically illustrating a basic configuration of a segment conductor.

The coil 84 is formed by joining the plurality of segment conductors 4 illustrated in FIG. 3. Each of the segment conductors 4 has lead portions (a first lead portion 43 and a second lead portion 44) at both ends in the extending direction of the segment conductor 4. The coil 84 is formed by sequentially joining the lead portions of the plurality of segment conductors 4.

Each of the segment conductors 4 is formed using one continuous linear conductor. Here, "continuous" means that the conductor is integrally formed in the extending direction without any seam. The linear conductor is made of a conductive material such as copper or aluminum. The surface of the linear conductor is coated with an insulating film made of an electrically insulating material such as a resin (for example, an enamel resin made of polyamideimide or the like) except for electrical connection portions between different members.

As illustrated in FIG. 3, in the present embodiment, a linear conductor (rectangular wire) with a rectangular (rectangular in the present embodiment) cross-section orthogonal to the extending direction is used as the linear conductor forming the segment conductor 4. In the present embodiment, the cross-sectional shape of the segment conductor 4 is a rectangular shape having the long side length W1 and a short side length W2. The shape of the cross-section is not prevented from being a square shape, and a rectangular shape in which corner portions are chamfered in an arc shape (R-chamfered) or linearly chamfered (C-chamfered), and a shape in which the absolute value of the difference between an internal angle and 90 degrees is less than a predetermined angle (for example, 5 degrees, 10 degrees, or the like) are included.

The segment conductor 4 includes a general segment conductor 5 that is continuously joined as described above to form a plurality of coil bodies 83 as the core of the coil 84, and a specific segment conductor 6 joined to each end of the coil body. In the present embodiment, the specific segment conductor 6 is the segment conductor 4 that connects the power line bus bars 87 that supply AC power from the inverter INV to the coil bodies 83, and connects the neutral point bus bar 88 that forms the neutral point of the coil 84 to the neutral point of each of the plurality of coil bodies 83.

FIG. 3 schematically illustrates the general segment conductor 5 as a representative of the segment conductor 4. The general segment conductor 5 has a substantially U-shape. As illustrated in FIG. 3, the long side surface side of the rectangular wire with a rectangular cross-section is the front side of the substantially U-shape, and the short side surface side of the rectangular wire is the side surface. The general segment conductor 5 is formed in a U-shape by edgewise bending in which the short side is bent except for a bent portion (radially bent portion 49) in the radial direction R to be described later.

Each of the segment conductors 4 has the first lead portion 43 and the second lead portion 44 at both ends in the extending direction of the segment conductor 4. In the substantially U-shape, the first lead portion 43 and the first end-side housed portion 41 (first housed portion) are continuously and linearly formed in a portion extending linearly on the first lead portion 43 side, and the second lead portion 44 and the second end-side housed portion 42 (second housed portion) are continuously and linearly formed in a portion extending linearly on the second lead portion 44 side. A connecting portion 40 is formed at the bottom of the substantially U-shape so as to connect the first end-side housed portion 41 and the second end-side housed portion 42. The radially bent portion 49 described above is formed at the central portion of the connecting portion 40. The radially bent portion 49 is formed by flatwise bending in which the long side is bent.

The first end-side housed portion 41 and the second end-side housed portion 42 are portions housed in the slot S of the stator core 80. The interval between the first end-side housed portion 41 and the second end-side housed portion 42 in the circumferential direction C is N times (N is a natural number) the interval between the slots S adjacent in the circumferential direction C. As described above, in the segment conductor 4, the plurality of housed portions are arranged inside one slot S in six layers with the arrangement region of one housed portion (first end-side housed portion 41, second end-side housed portion 42, or the like) in the radial direction R as one layer. That is, a plurality of housed portions are arranged in a line along the radial direction R inside one slot S. Therefore, the interval in the circumferential direction C is different between the radially inner side R1 and the radially outer side R2. As a result, the interval in the circumferential direction C between the first end-side housed portion 41 and the second end-side housed portion 42 of the segment conductor 4 disposed on the radially outer side R2 is wider than the interval in the circumferential direction C between the first end-side housed portion 41 and the second end-side housed portion 42 of the segment conductor 4 disposed on the radially inner side R1.

The segment conductor 4 is inserted into the slot S along the axial direction L from the axial first side L1 toward the axial second side L2 into the stator core 80, from the first lead portion 43 and the second lead portion 44 side. The connecting portion 40 is a portion projecting to the axial first side L1 of the stator core 80 in a state where the first end-side housed portion 41 and the second end-side housed portion 42 of the segment conductor 4 are housed in the slot S. The first lead portion 43 and the second lead portion 44 are portions projecting to the axial second side L2 of the stator core 80 in a state where the first end-side housed portion 41 and the second end-side housed portion 42 of the segment conductor 4 are housed in the slot S. The projecting first lead portion 43 and second lead portion 44 are bent in the circumferential direction C as indicated by two-dot chain lines in FIG. 3, and are joined to the lead portions of the other segment conductors 4 by welding or the like. The first lead portion 43 and the second lead portion 44 correspond to a joint portion 45 in contrast to the connecting portion 40.

In this manner, a portion where the coil 84 projects, that is, a so-called coil end portion is formed on the axial first side L1 and the axial second side L2 of the stator core 80. When these coil end portions are distinguished from each other, the coil end portion formed by the connecting portion 40 on the axial first side L1 is referred to as "first coil end portion 85", and the coil end portion formed by the joint portion 45 on the axial second side L2 is referred to as "second coil end portion 86". The length from an axial first side end face 81 of the stator core 80 to the portion of the connecting portion 40 projecting most to the axial first side L1 corresponds to the length of the first coil end portion 85 in the axial direction L. The length from an axial second side end face 82 of the stator core 80 to the portion of the joint portion 45 projecting most to the axial second side L2 corresponds to the length of the second coil end portion 86 in the axial direction L.

In addition to the general segment conductor 5 forming the coil body 83, the coil 84 also includes the power line bus bar 87 that connects the coil body 83 and a power supply (in this case, the inverter INV that supplies AC power), and the specific segment conductor 6 electrically connected to the neutral point bus bar 88 connecting different phases in the coil body 83. As illustrated in FIGS. 1, 4 to 7, and the like, the specific segment conductor 6 has the specific housed portion 63 housed in the slot S of the stator core 80 and an axially extending portion 64 extending in the axial direction L on the axial first side L1 of the stator core 80.

In the present embodiment, the specific segment conductor 6 includes a radially extending portion 65 extending in the radial direction R at a position closer to the axial first side L1 than the connecting portion 40 (general segment connecting portion 55) of the general segment conductor 5 to be closer to the radially outer side R2 than the axially extending portion 64. Since the radially extending portion 65 is provided, it is easy to join the power line bus bar 87 and the neutral point bus bar 88 to the specific segment conductor 6 by welding or the like. It is needless to mention that, as long as the power line bus bar 87 and the neutral point bus bar 88 can be appropriately joined to the specific segment conductor 6, the specific segment conductor 6 may be formed without the radially extending portion 65.

As described later, the axially extending portion 64 is disposed in the stator core 80 so as not to overlap the connecting portion 40 (general segment connecting portion 55) of the general segment conductor 5 in axial view. On the other hand, the radially extending portion 65 overlaps the general segment connecting portion 55 in axial view in a state of being disposed in the stator core 80.

Figure 6:
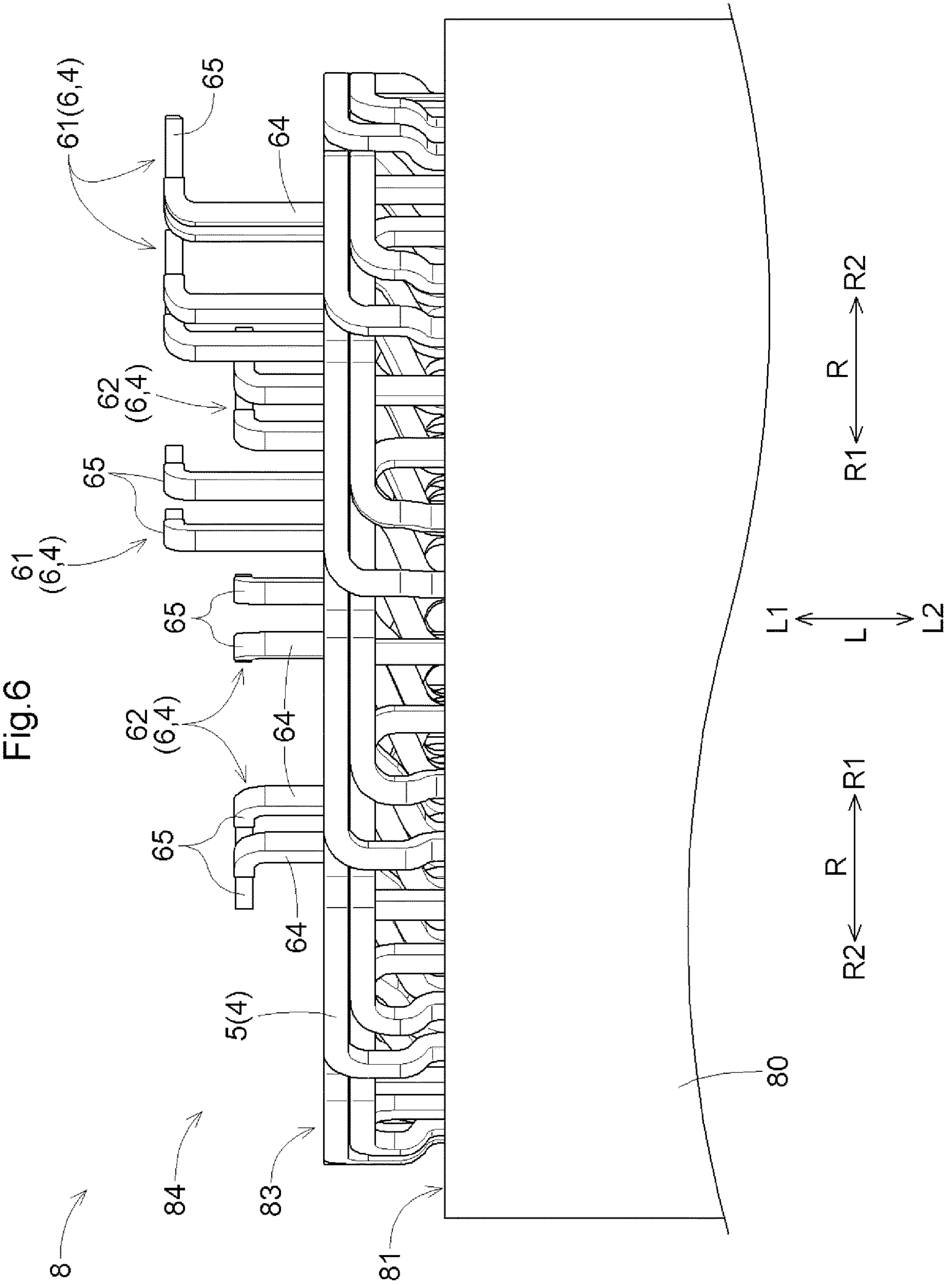
FIG. 6 is a partial side view illustrating the appearance of the stator.

The plurality of specific segment conductors 6 include a plurality of power line conductors 61 connected to an AC power supply (here, the inverter INV) and a plurality of neutral point conductors 62 for connecting neutral points of the plurality of coil bodies 83. As illustrated in FIGS. 1, 6, and the like, the radially extending portions 65 of the plurality of power line conductors 61 are arranged to be closer to the axial first side L1 than the radially extending portions 65 of the plurality of neutral point conductors 62.

The power line conductor 61 and the neutral point conductor 62 are electrically connected to different objects. In addition, in a case where the radially extending portion 65 is provided, the radially extending portion 65 is connected to the AC power supply (inverter INV) or a member connecting neutral points. Since the radially extending portions 65 of the power line conductor 61 and the neutral point conductor 62 are arranged at different positions in the axial direction L as described above, the power line conductor 61 and the neutral point conductor 62 can be appropriately connected to the connection targets. The neutral point is obtained by connecting the coil bodies 83, and the AC power supply is disposed separately from the coil body 83. Therefore, since the radially extending portions 65 of the plurality of power line conductors 61 are arranged to be closer to the axial first side L1 than the radially extending portions 65 of the plurality of neutral point conductors 62, it is easy to implement a configuration in which the conductors connecting the plurality of neutral point conductors 62 to each other in the circumferential direction C are arranged and the plurality of power line conductors 61 are individually connected to the AC power supply.

According to the above configuration, for example, the coil 84 of each phase can be joined to the neutral point bus bar 88 on the axial second side L2 of the power line bus bar 87. Since the inverter INV is disposed at a place different from the stator 8, the bus bars can also be efficiently arranged by making the joint portion between the neutral point bus bar 88 and the coil 84 closer to the stator 8 than the joint portion between the power line bus bar 87 and the coil 84. However, for example, there is also a case where the inverter INV and the stator core 80 are arranged at positions overlapping each other in the axial direction L. In this case, for example, it may be preferable that the radially extending portion 65 of the power line conductor 61 be disposed at a position close to the axial first side end face 81 of the stator core 80. Therefore, it is not limited to the mode in which the radially extending portions 65 of the plurality of power line conductors 61 are arranged to be closer to the axial first side L1 than the radially extending portions 65 of the plurality of neutral point conductors 62, it is possible to adopt the mode in which the radially extending portions 65 of the plurality of power line conductors 61 are arranged to be closer to the axial second side L2 than the radially extending portions 65 of the plurality of neutral point conductors 62. In addition, it is possible to adopt the mode in which the radially extending portions 65 of the plurality of power line conductors 61 and the radially extending portions 65 of the plurality of neutral point conductors 62 are arranged at the same positions in the axial direction L.

In the present embodiment, as illustrated in FIG. 1, in the present embodiment, the neutral point conductor 62 is disposed midway in the power line conductors 61 arranged along the circumferential direction C. That is, the mode in which the neutral point conductor 62, the neutral point conductor 62, the power line conductor 61, the neutral point conductor 62, the power line conductor 61, and the power line conductor 61 are arranged in this order from the circumferential first side C1 toward the circumferential second side C2 is illustrated. However, it is possible to adopt the mode in which the neutral point conductors 62 and the power line conductors 61 are individually arranged continuously in the circumferential direction C.

In a case where the segment conductors 4 are housed from the radially outer side R2 to the radially inner side R1 of the stator core 80, the specific segment conductors 6 are often arranged on the radially inner side R1. In a case where the connecting portion 40 of the segment conductor 4 disposed on the radially innermost side R1 among the segment conductors 4 (general segment conductors 5) constituting the coil body 83 overlaps the region in the radial direction R of the slot S in which the specific housed portion 63 of the specific segment conductor 6 is disposed in axial view like a stator 8B of a comparative example illustrated in FIG. 8, it is difficult to insert the specific segment conductor 6 into the slot S along the axial direction L after the connecting portion 40 is disposed in the portion of the slot S.

Figure 8:
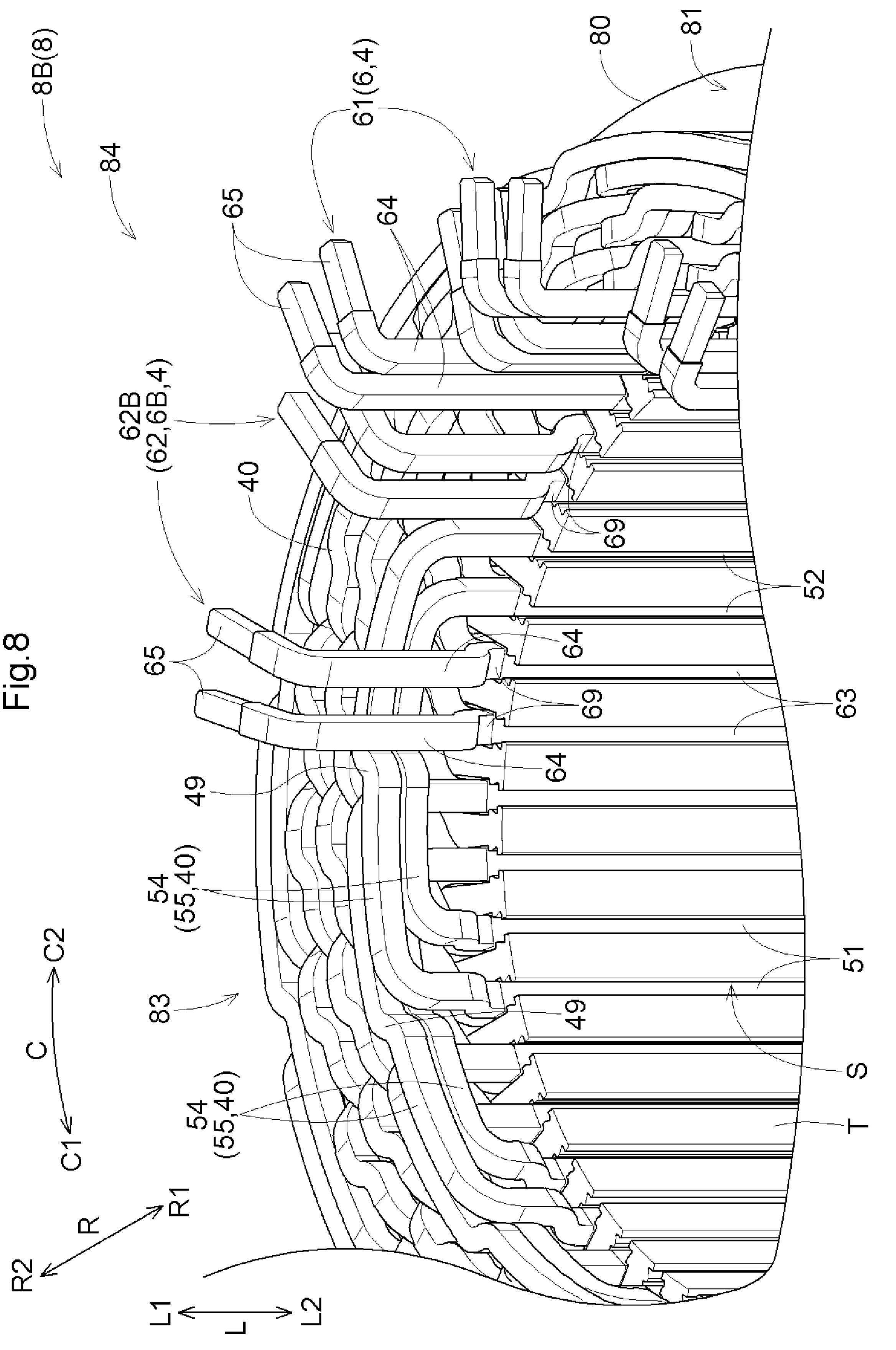
FIG. 8 is an enlarged perspective diagram of a stator of a comparative example as viewed from the radially inner side.

For example, if the general segment conductor 5 having the connecting portion 40 is attached to the stator core 80 after the specific segment conductor 6 is inserted into the slot S, the difficulty of assembling work increases, which may lead to a decrease in workability. In particular, as illustrated in FIG. 8, in a case where the radially extending portion 65 is formed from the end of the axially extending portion 64 on the axial first side L1 toward the radially outer side R2, the work of attaching the general segment conductor 5 to the stator core 80 after inserting the specific segment conductor 6 into the slot S is highly difficult.

In addition, it is conceivable to insert both the segment conductors 4 into the slots S along the axial direction L in a state where the general segment conductor 5 having the connecting portion 40 and the specific segment conductor 6 are combined in advance, but in this case as well, the difficulty of the assembling work increases, which may lead to a decrease in workability. That is, in a case where the connecting portion 40 of the segment conductor 4 disposed on the radially innermost side R1 among the segment conductors 4 (general segment conductors 5) constituting the coil body 83 overlaps the region in the radial direction R of the slot S in which the specific housed portion 63 of the specific segment conductor 6 is disposed in axial view like the stator 8B of the comparative example illustrated in FIG. 8, the segment conductor 4 cannot be easily housed in the slot S due to the interference between the connecting portion 40 and the specific segment conductor 6.

On the other hand, the stator 8 of the present embodiment is configured in a manner that in which the specific segment conductor 6 can be attached to the stator core 80 so as not to interfere with the segment conductor 4 (general segment conductor 5) constituting the coil body 83 when the segment conductor 4 is assembled to the stator core 80.

As described above, the stator 8 of the present embodiment includes the cylindrical stator core 80 having the plurality of slots S arranged side by side in the circumferential direction C, and the coil 84 wound around the stator core 80. The coil 84 is configured by joining the plurality of segment conductors 4, and the plurality of joint portions 45 (first lead portion 43 and second lead portion 44) for joining the plurality of segment conductors 4 to each other are provided on the axial second side L2 of the stator core 80. The plurality of segment conductors 4 include the plurality of general segment conductors 5 continuously joined to each other to constitute the plurality of coil bodies 83 (the coil body 83 of the first-phase coil 1, the coil body 83 of the second-phase coil 2, and the coil body 83 of the third-phase coil 3) and the specific segment conductors 6 joined to the ends of the plurality of coil bodies 83.

Figure 4:
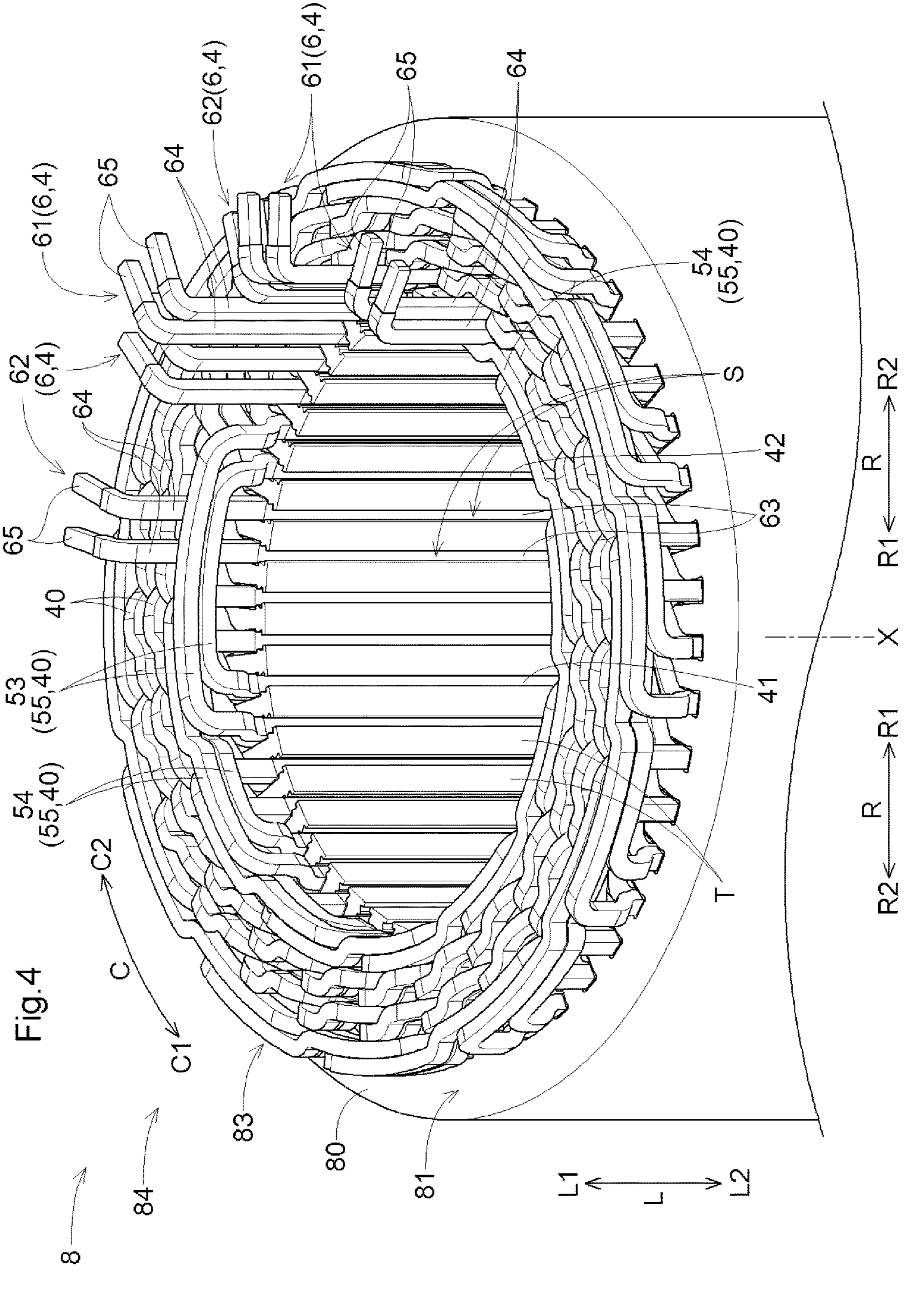
FIG. 4 is a partial perspective diagram of the stator as viewed from a radially inner side.
Figure 7:
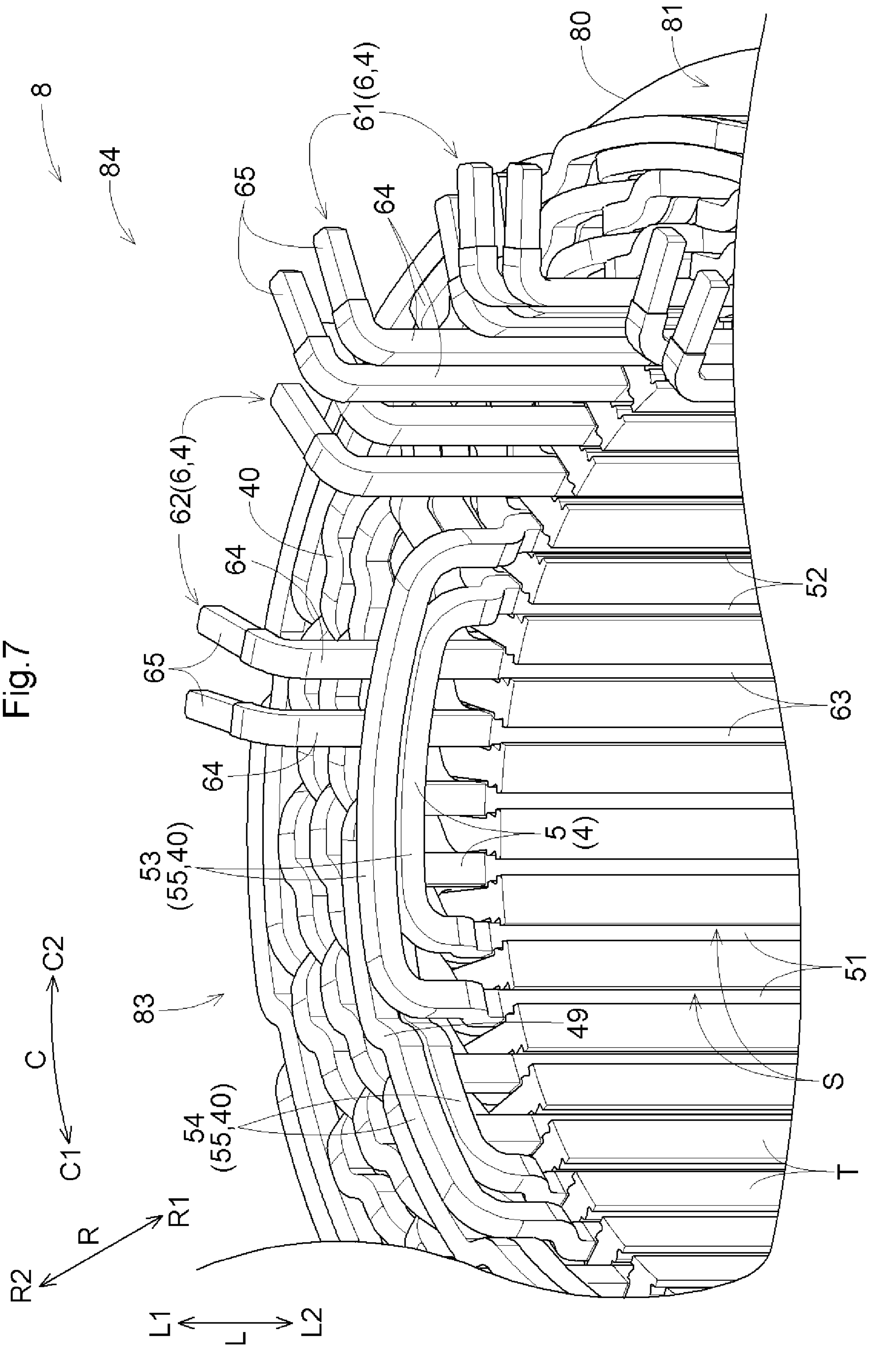
FIG. 7 is an enlarged perspective diagram of the stator as viewed from the radially inner side.

As illustrated in FIGS. 1, 4, 7, and the like, the general segment conductor 5 includes a first housed portion 51 housed in a first slot S1, a second housed portion 52 housed in a second slot S2 that is the slot S disposed to be spaced apart from the first slot S1 in the circumferential direction C, and a general segment connecting portion 55 (connecting portion 40) that connects the first housed portion 51 and the second housed portion 52 on the axial first side L1 of the stator core 80.

The specific segment conductor 6 includes the specific housed portion 63 housed in the slot S and the axially extending portion 64 extending along the axial direction L on the axial first side L1 of the stator core 80. Although not illustrated, a lead portion is formed from the specific housed portion 63 to be continuous with the specific housed portion 63 so as to project from the axial second side end face 82 of the stator core 80 to the axial second side L2, similarly to the general segment conductor 5. Any end (joint portion 45) of the first-phase coil 1, the second-phase coil 2, and the third-phase coil 3 is joined to the specific segment conductor 6 at this lead portion.

As illustrated in FIGS. 1, 4, 5, 7, and the like, the axially extending portions 64 of at least some of the plurality of specific segment conductors 6 are arranged so as not to overlap the general segment connecting portion 55 in axial view along the axial direction L and to have a portion sandwiched, in the radial direction R, between the plurality of general segment connecting portions 55 arranged at different positions in the radial direction R.

As described above, the plurality of segment conductors 4 are assembled to the stator core 80 by being inserted into the slots S of the stator core 80 from the axial first side L1. As illustrated in FIG. 7, the axially extending portion 64 of the specific segment conductor 6 is linearly formed without being bent in the radial direction R. That is, the specific housed portion 63 and the axially extending portion 64 are continuously and linearly formed. For this reason, the connecting portion 40 of the general segment conductor 5 is not disposed at a position overlapping the specific housed portion 63 in axial view. Therefore, the specific segment conductor 6 and the general segment conductor 5 can be appropriately inserted into the slots S from the axial first side L1 without interference between the specific housed portion 63 and the connecting portion 40.

On the other hand, in a specific segment conductor 6B of the comparative example (neutral point conductor 62B of the comparative example) illustrated in FIG. 8, a specific bent portion 69 in which the specific segment conductor 6 is bent in the radial direction R is formed between the specific housed portion 63 and the axially extending portion 64 (here, the end of the axially extending portion 64 on the axial second side L2 is bent to the radially outer side R2). As a result, in axial view, the position in the radial direction R of the slot S where the specific housed portion 63 overlaps is different from the position in the radial direction R of the slot S where the axially extending portion 64 overlaps. Therefore, in axial view, the connecting portion 40 of the general segment conductor 5 can be disposed at the position in the radial direction R of the slot S where the specific housed portion 63 overlaps. However, in a case where the connecting portion 40 of the general segment conductor 5 is disposed at this position, the specific housed portion 63 cannot be inserted straight into the slot S from the axial first side L1, and assembling workability decreases significantly as described above.

Also in the present embodiment, the specific bent portion 69 in which the specific segment conductor 6 is bent in the radial direction R is not prevented from being formed between the specific housed portion 63 and the axially extending portion 64. For example, if the specific bent portion 69 is formed so as to be bent in a direction opposite to the specific segment conductor 6B of the comparative example in the radial direction R (in this case, to the radially inner side R1 at the end of the axially extending portion 64 on the axial second side L2), the assembly of the segment conductor 4 is not affected.

In the present embodiment, even in a case where the plurality of segment conductors 4 are assembled in order from those arranged on the radially outer side R2 in the slots S, it is easy to prevent the specific segment conductor 6 from hindering the assembly of the general segment conductor 5, and to prevent the general segment conductor 5 from hindering the assembly of the specific segment conductor 6.

As described above, in the present embodiment, the specific segment conductor 6 includes the radially extending portion 65 extending in the radial direction R at a position closer to the axial first side L1 than the connecting portion 40 (general segment connecting portion 55) of the general segment conductor 5 to be closer to the radially outer side R2 than the axially extending portion 64. Since the radially extending portion 65 is provided, it is easy to join the power line bus bar 87 and the neutral point bus bar 88 to the specific segment conductor 6 by welding or the like. In a case where such a radially extending portion 65 is provided, the radially extending portion 65 easily interferes when the general segment conductor 5 is assembled to the stator core 80. However, as described above, since the specific segment conductor 6 can be assembled later than the general segment conductor 5 that is closer to the radially outer side R2 than the specific segment conductor 6, such interference can be avoided.

In the present embodiment, the mode in which the radially extending portion 65 is formed by being bent from the axially extending portion 64 to the radially outer side R2 is exemplified, but the axially extending portion 64 and the radially extending portion 65 may be connected via another bent portion (for example, a bent portion in the circumferential direction C) or the like.

As illustrated in FIG. 5, in the present embodiment, there is only one connecting portion 40 (general segment connecting portion 55) disposed closer to the radially inner side R1 than the axially extending portion 64 in axial view.

The general segment conductors 5 are arranged over a plurality of circumferences in the radial direction R. However, when the connecting portion 40 (general segment connecting portion 55) of the general segment conductor 5 is disposed on the radially inner side R1 in only one circumference as in the present embodiment, in a case where the specific segment conductor 6 is disposed on the radially innermost side R1 in the slot S, the axially extending portion 64 is formed linearly, and the assemblability of the specific segment conductor 6 to the stator core 80 is easily improved. In addition, the shape of the specific segment conductor 6 is also easily simplified. For example, unlike the specific segment conductor 6B of the comparative example illustrated in FIG. 8, the bent portion (specific bent portion 69) in the radial direction R does not need to be formed.

Among the plurality of connecting portions 40 (general segment connecting portions 55) arranged on the innermost side in the radial direction R, one connecting portion 40 (first general segment connecting portion 53 in FIG. 7 and the like) having a portion overlapping the specific segment conductor 6 in radial view is formed so as not to have a portion bent in the radial direction R in the entire region of the portion extending in the circumferential direction C. In addition, the other connecting portion 40 (second general segment connecting portion 54 in FIG. 7 and the like) has a bent portion (radially bent portion 49) bent in the radial direction R in a portion extending in the circumferential direction C.

According to this configuration, it is easy to sequentially assemble the general segment conductors 5 having the connecting portion 40 (general segment connecting portions 55) disposed on the innermost side in the radial direction R in the circumferential direction C. Therefore, it is easy to configure the stator 8 with good assemblability of the segment conductor 4 to the stator core 80.

In the stator 8B of the comparative example illustrated in FIG. 8, the connecting portion 40 having a portion overlapping the specific segment conductor 6 in radial view includes the radially bent portion 49 bent in the radial direction R in a portion extending in the circumferential direction C. More specifically, among the plurality of connecting portions 40 (general segment connecting portions 55) having the portion disposed on the innermost side in the radial direction R, the connecting portion 40 that transitions (performs lane change) from the innermost side in the radial direction R to the radially outer side R2 via the radially bent portion 49 overlaps the specific segment conductor 6 in the region transitioned to the radially outer side R2 in radial view. In this case, the connecting portion 40 bent to the radially outer side R2 at the radially bent portion 49 and the region in the radial direction R of the slot S into which the specific segment conductor 6 is inserted overlap each other in axial view. Therefore, the assemblability of the segment conductor 4 to the stator core 80 is degraded as compared with the present embodiment.

Even in a case where, among the plurality of connecting portions 40 (general segment connecting portions 55) arranged on the innermost side in the radial direction R, the connecting portion 40 having the portion overlapping the specific segment conductor 6 in radial view includes the bent portion (radially bent portion 49) bent in the radial direction R in the portion extending in the circumferential direction C, the assemblability may not be degraded. That is, in a case where the portion of the connecting portion 40 passing through the innermost side in the radial direction R and the specific segment conductor 6 (axially extending portion 64) overlap each other in radial view like the neutral point conductor 62 illustrated in FIG. 5, the connecting portion 40 and the region in the radial direction R of the slot S into which the specific segment conductor 6 is inserted do not overlap each other in axial view. Therefore, the segment conductors 4 can be appropriately assembled to the stator core 80.

Summary of Present Embodiment

Hereinafter, the stator (8) described above will be briefly summarized.

In view of the above, a stator (8) of a rotating electrical machine includes a stator core (80) with a cylindrical shape, having a plurality of slots(S) arranged side by side in a circumferential direction (C), and a coil (84) wound around the stator core (80), a direction along an axial center (X) of the stator core (80) is assumed to be an axial direction (L), a direction orthogonal to the axial center (X) is assumed to be a radial direction (R), one side in the axial direction (L) is assumed to be an axial first side (L1), and the other side in the axial direction (L) is assumed to be an axial second side (L2), the coil (84) is configured by joining a plurality of segment conductors (4), a plurality of joint portions (45) joining a plurality of the segment conductors (4) to each other are provided on the axial second side (L2) of the stator core (80), a plurality of the segment conductors (4) include a plurality of general segment conductors (5) continuously joined to each other to constitute a plurality of coil bodies (83) and a specific segment conductor (6) joined to an end of each of a plurality of the coil bodies (83), each of the general segment conductors (5) includes a first housed portion (51) housed in a first slot (S1) as a first slot of the slots(S), a second housed portion (52) housed in a second slot (S2) that is the slot(S) disposed to be spaced apart from the first slot (S1) in the circumferential direction (C), and a connecting portion (40) connecting the first housed portion (51) and the second housed portion (52) on the axial first side (L1) of the stator core (80), the specific segment conductor (4) includes a specific housed portion (63) housed in the slot(S) and an axially extending portion (64) extending along the axial direction (L) on the axial first side (L1) of the stator core (80), and the axially extending portions (64) of at least some of a plurality of the specific segment conductors (6) are arranged so as to have a portion that does not overlap the connecting portion (40) in axial view along the axial direction (L) and is sandwiched, in the radial direction (R), between a plurality of the connecting portions (40) arranged at different positions in the radial direction (R).

A plurality of the segment conductors (4) are assembled to the stator core (80) by being inserted into the slots S of the stator core (80) from the axial first side (L1). According to this configuration, in this case, even when a plurality of the segment conductors (4) are assembled in order from those arranged on the outer side (R2) in the radial direction (R) in the slots S, it is easy to prevent the specific segment conductor (6) from hindering the assembly of the general segment conductor (5), and to prevent the general segment conductor (5) from hindering the assembly of the specific segment conductor (6). That is, according to this configuration, it is possible to obtain the stator (8) in which the specific segment conductor (6) can be attached to the stator core (80) so as not to interfere with the segment conductor (4) constituting the body (83) of the coil (84) when the segment conductor(S) is assembled to the stator core (80).

The specific segment conductor (6) preferably includes a radially extending portion (65) extending in the radial direction (R) at a position closer to the axial first side (L1) than the connecting portion (40) of the general segment conductor (5) to be closer to the outer side (R2) in the radial direction (R) than the axially extending portion (64).

Since the specific segment conductor (6) includes the radially extending portion (65), it is easy to join the power line bus bar (87) and the neutral point bus bar (88) to the specific segment conductor (6) by welding or the like. In a case where such a radially extending portion (65) is provided, the radially extending portion (65) easily interferes when the general segment conductor (5) is assembled to the stator core (80). However, as described above, since the specific segment conductor (6) can be assembled later than the general segment conductor (5) that is closer to the radially outer side (R2) than the specific segment conductor (6), such interference can be avoided.

Preferably, a plurality of the specific segment conductors (6) include a plurality of power line conductors (61) connected to an AC power supply (INV) and a plurality of neutral point conductors (62) for connecting the neutral points of a plurality of the coil bodies (83), and the radially extending portions (65) of a plurality of the power line conductors (61) are arranged closer to the axial first side (L1) than the radially extending portions (65) of a plurality of the neutral point conductors (62).

The power line conductor (61) and the neutral point conductor (62) are electrically connected to different objects. In addition, in a case where the radially extending portion (65) is provided, the radially extending portion (65) is connected to the AC power supply (INV) or a member connecting neutral points. As described above, since the radially extending portions (65) of the power line conductor (61) and the neutral point conductor (62) are arranged at different positions in the axial direction (L), the power line conductor (61) and the neutral point conductor (62) can be appropriately connected to the connection targets. The neutral point is obtained by connecting the coil bodies (83), and the AC power supply is disposed separately from the coil body (83). Therefore, since the radially extending portions (65) of a plurality of the power line conductors (61) are arranged to be closer to the axial first side (L1) than the radially extending portions (65) of a plurality of the neutral point conductors (62), it is easy to implement a configuration in which the conductors connecting a plurality of the neutral point conductors (62) to each other in the circumferential direction C are arranged and a plurality of the power line conductors (61) are individually connected to the AC power supply (INV).

Furthermore, the stator (8) preferably has only one connecting portion (40) disposed closer to the inner side (R1) in the radial direction (R) than the axially extending portion (64) in axial view.

The general segment conductors 5 are arranged over a plurality of circumferences in the radial direction (R). However, when the connecting portion (40) of the general segment conductor (5) is disposed on the radially inner side (R1) in only one circumference as in this configuration, in a case where the specific segment conductor (6) is disposed on the radially innermost side (R1) in the slot(S), the axially extending portion (64) is formed linearly, and the assemblability of the specific segment conductor (6) to the stator core (80) is easily improved. In addition, the shape of the specific segment conductor (6) is also easily simplified.

Furthermore, it is preferable in the stator (8) that, among a plurality of the connecting portions (40) arranged on the innermost side in the radial direction (R), one connecting portion (40) having a portion overlapping the specific segment conductor (6) in radial view be formed so as not to have a portion bent in the radial direction (R) in the entire region of the portion extending in the circumferential direction (C), and the other connecting portions (40) have a bent portion (49) bent in the radial direction (R) in a portion extending in the circumferential direction (C).

According to this configuration, it is easy to sequentially assemble the general segment conductors (5) having the connecting portion (40) disposed on the innermost side in the radial direction (R) in the circumferential direction (C). Therefore, it is easy to configure the stator (8) with good assemblability of the segment conductor (4) to the stator core (80).

REFERENCE SIGNS LIST

4: Segment conductor, 5: General segment conductor, 6: Specific segment conductor, 8: Stator, 40: Connecting portion, 45: Joint portion, 51: First housed portion, 52: Second housed portion, 61: Power line conductor, 62: Neutral point conductor, 62B: Neutral point conductor, 63: Specific housed portion, 64: Axially extending portion, 65: Radially extending portion, 80: Stator core, 83: Coil body, 84: Coil, C: Circumferential direction, INV: Inverter (AC power supply), L: Axial direction, L1: Axial first side, L2: Axial second side, R: Radial direction, R1: Radially inner side (Inner side in radial direction), R2: Radially outer side (Outer side in radial direction), S: Slot, S1: First slot, S2: Second slot, and X: Axial center.

The invention claimed is:

1. A stator of a rotating electrical machine comprising: a stator core with a cylindrical shape, having a plurality of slots arranged side by side in a circumferential direction; and a coil wound around the stator core, wherein a direction along an axial center of the stator core is an axial direction, a direction orthogonal to the axial center is a radial direction, one side in the axial direction is an axial first side, and another side in the axial direction is an axial second side, the coil is configured by joining a plurality of segment conductors, a plurality of joint portions joining a plurality of the segment conductors to each other are provided on the axial second side of the stator core, a plurality of the segment conductors include a plurality of general segment conductors continuously joined to each other to constitute a plurality of coil bodies and a specific segment conductor joined to an end of each of a plurality of the coil bodies, each of the general segment conductors includes a first housed portion housed in a first slot as a first slot of the slots, a second housed portion housed in a second slot that is the slot disposed to be spaced apart from the first slot in the circumferential direction, and a connecting portion connecting the first housed portion and the second housed portion on the axial first side of the stator core, the specific segment conductor includes a specific housed portion housed in a respective slot of the plurality of slots and an axially extending portion extending along the axial direction on the axial first side of the stator core, a plurality of housed portions of the general segment conductors and the specific housed portion are arranged in a row along the radial direction inside the respective slot, with the specific housed portion being disposed on a radially innermost side inside the respective slot, and the axially extending portions of at least some of a plurality of the specific segment conductors are arranged so as to have a portion that does not overlap the connecting portion in axial view along the axial direction and is sandwiched, in the radial direction, between a plurality of the connecting portions arranged at different positions in the radial direction.

2. The stator according to claim 1, wherein the specific segment conductor includes a radially extending portion extending in the radial direction at a position closer to the axial first side than the connecting portion of the general segment conductor to be closer to an outer side in the radial direction than the axially extending portion.

3. The stator according to claim 2, wherein a plurality of the specific segment conductors include a plurality of power line conductors connected to an AC power supply and a plurality of neutral point conductors for connecting neutral points of a plurality of the coil bodies, and the radially extending portions of a plurality of the power line conductors are arranged closer to the axial first side than the radially extending portions of a plurality of the neutral point conductors.

4. The stator according to claim 3, wherein one connecting portion is disposed closer to an inner side in the radial direction than the axially extending portion in the axial view.

5. The stator according to claim 4, wherein among a plurality of the connecting portions arranged on an innermost side in the radial direction, one connecting portion having a portion overlapping the specific segment conductor in radial view along the radial direction is formed so as not to have a portion bent in the radial direction in an entire region of a portion extending in the circumferential direction, and another connecting portion has a bent portion bent in the radial direction in a portion extending in the circumferential direction.

6. The stator according to claim 2, wherein one connecting portion is disposed closer to an inner side in the radial direction than the axially extending portion in the axial view.

7. The stator according to claim 6, wherein among a plurality of the connecting portions arranged on an innermost side in the radial direction, one connecting portion having a portion overlapping the specific segment conductor in radial view along the radial direction is formed so as not to have a portion bent in the radial direction in an entire region of a portion extending in the circumferential direction, and another connecting portion has a bent portion bent in the radial direction in a portion extending in the circumferential direction.

8. The stator according to claim 1, wherein one connecting portion is disposed closer to an inner side in the radial direction than the axially extending portion in the axial view.

9. The stator according to claim 8, wherein among a plurality of the connecting portions arranged on an innermost side in the radial direction, one connecting portion having a portion overlapping the specific segment conductor in radial view along the radial direction is formed so as not to have a portion bent in the radial direction in an entire region of a portion extending in the circumferential direction, and another connecting portion has a bent portion bent in the radial direction in a portion extending in the circumferential direction.

10. A stator of a rotating electrical machine comprising: a stator core with a cylindrical shape, having a plurality of slots arranged side by side in a circumferential direction; and a coil wound around the stator core, wherein:

a direction along an axial center of the stator core is an axial direction, a direction orthogonal to the axial center is a radial direction, one side in the axial direction is an axial first side, and another side in the axial direction is an axial second side, the coil is configured by joining a plurality of segment conductors, a plurality of joint portions joining a plurality of the segment conductors to each other are provided on the axial second side of the stator core, a plurality of the segment conductors include a plurality of general segment conductors continuously joined to each other to constitute a plurality of coil bodies and a specific segment conductor joined to an end of each of a plurality of the coil bodies, each of the general segment conductors includes a first housed portion housed in a first slot as a first slot of the slots, a second housed portion housed in a second slot that is the slot disposed to be spaced apart from the first slot in the circumferential direction, and a connecting portion connecting the first housed portion and the second housed portion on the axial first side of the stator core, the specific segment conductor includes a specific housed portion housed in the slot and an axially extending portion extending along the axial direction on the axial first side of the stator core, the axially extending portions of at least some of a plurality of the specific segment conductors are arranged so as to have a portion that does not overlap the connecting portion in axial view along the axial direction and is sandwiched, in the radial direction, between a plurality of the connecting portions arranged at different positions in the radial direction, and the specific segment conductor includes a radially extending portion extending in the radial direction at a position closer to the axial first side than the connecting portion of the general segment conductor to be closer to an outer side in the radial direction than the axially extending portion.

11. A stator of a rotating electrical machine comprising: a stator core with a cylindrical shape, having a plurality of slots arranged side by side in a circumferential direction; and a coil wound around the stator core, wherein:

a direction along an axial center of the stator core is an axial direction, a direction orthogonal to the axial center is a radial direction, one side in the axial direction is an axial first side, and another side in the axial direction is an axial second side, the coil is configured by joining a plurality of segment conductors, a plurality of joint portions joining a plurality of the segment conductors to each other are provided on the axial second side of the stator core, a plurality of the segment conductors include a plurality of general segment conductors continuously joined to each other to constitute a plurality of coil bodies and a specific segment conductor joined to an end of each of a plurality of the coil bodies, each of the general segment conductors includes a first housed portion housed in a first slot as a first slot of the slots, a second housed portion housed in a second slot that is the slot disposed to be spaced apart from the first slot in the circumferential direction, and a connecting portion connecting the first housed portion and the second housed portion on the axial first side of the stator core, the specific segment conductor includes a specific housed portion housed in the slot and an axially extending portion extending along the axial direction on the axial first side of the stator core, the axially extending portions of at least some of a plurality of the specific segment conductors are arranged so as to have a portion that does not overlap the connecting portion in axial view along the axial direction and is sandwiched, in the radial direction, between a plurality of the connecting portions arranged at different positions in the radial direction, one connecting portion is disposed closer to an inner side in the radial direction than the axially extending portion in the axial view, and among a plurality of the connecting portions arranged on an innermost side in the radial direction, one connecting portion having a portion overlapping the specific segment conductor in radial view along the radial direction is formed so as not to have a portion bent in the radial direction in an entire region of a portion extending in the circumferential direction, and another connecting portion has a bent portion bent in the radial direction in a portion extending in the circumferential direction.

* * * * *